April 22, 1924.
T. B. NISBET
WINDSHIELD FOR AUTOMOBILES
Filed April 21, 1917
1,491,058
2 Sheets-Sheet 1
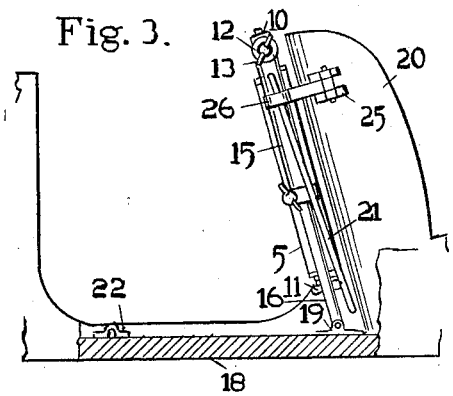
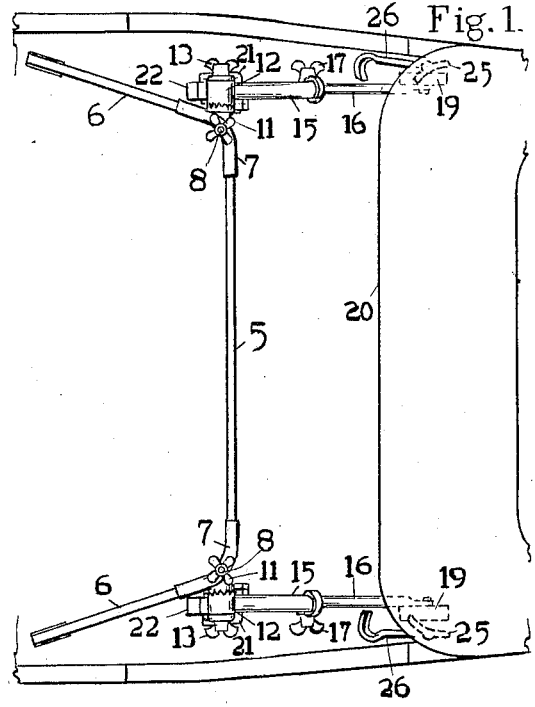
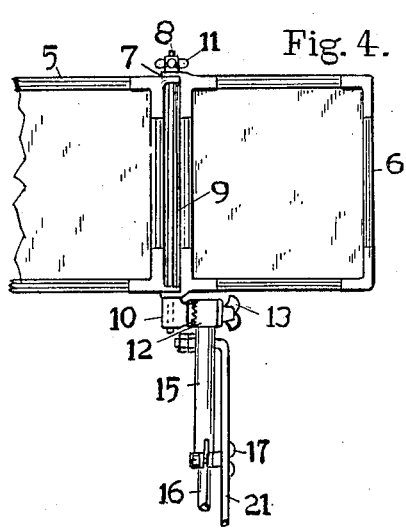
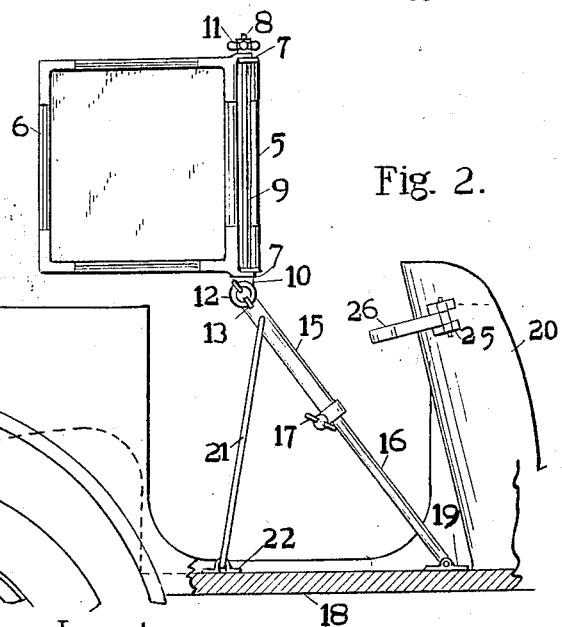
Witness:
Samuel W. Balch
Inventor,
Theodore B. Nisbet,
by
Attorneys.

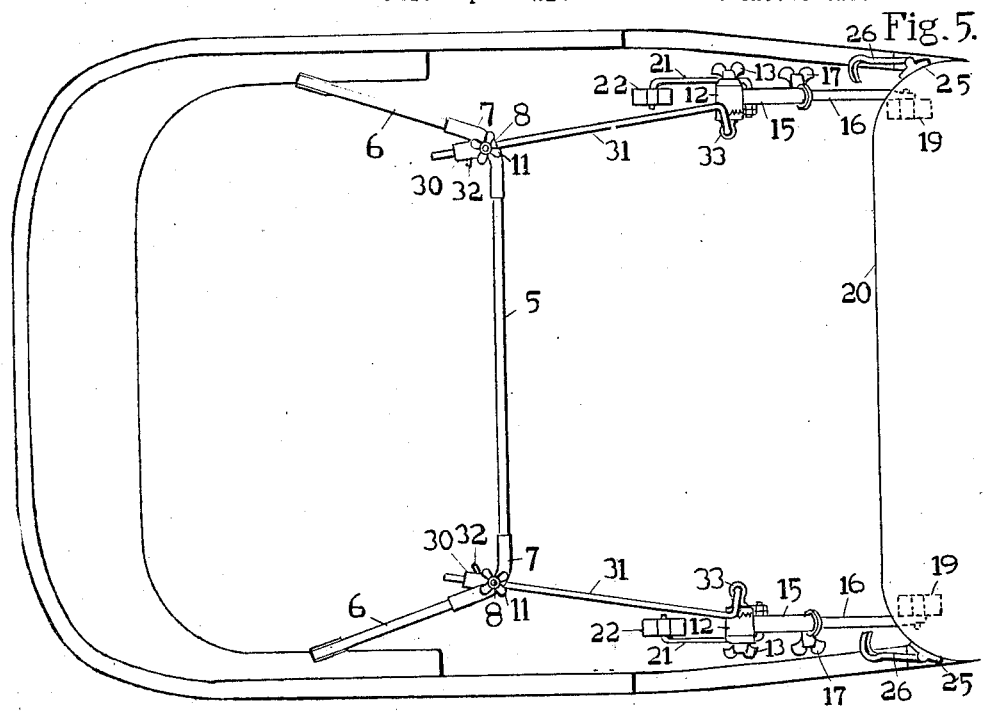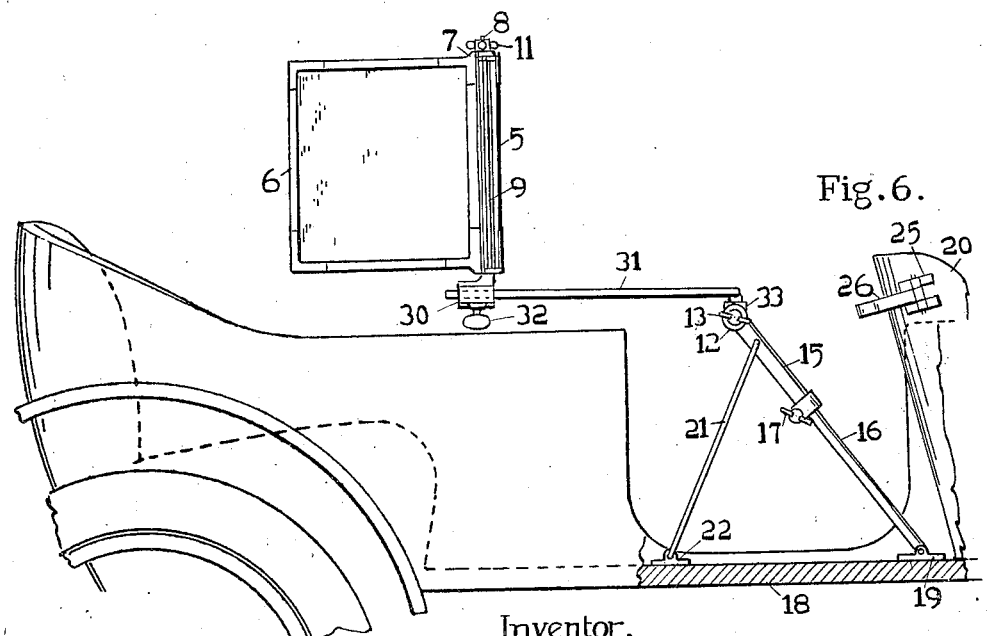

UNITED STATES PATENT OFFICE.

THEODORE B. NISBET, OF IRVINGTON, NEW YORK.

WINDSHIELD FOR AUTOMOBILES.

Application filed April 21, 1917. Serial No. 163,712.

*To all whom it may concern:*

Be it known that I, THEODORE B. NISBET, a citizen of the United States of America, and a resident of Irvington, in the county of Westchester and State of New York, have invented certain new and useful Improvements in Windshields for Automobiles, of which the following is a specification.

This invention relates to wind-shields for automobiles or other vehicles and is designed primarily for protecting the occupants at the rear of the front seat against the wind occasioned by the forward travel of the machine.

The object of the invention is the production of a wind-shield whose operative position in respect to the rear seat of the vehicle is adjustable so that it is capable of use in cars of varying size tonneaus and which shield can be folded down back of the front seat when it is not desired to be maintained in operative position, and there fastened out of the way of the occupants of the car.

In my U. S. Reissue Letters Patent No. 14,872 of June 1, 1920, I have described a wind-shield of the general character above referred to which wind-shield and its operative parts comprises in part radial arms which unfold one along each side of the tonneau and which support the wind-shield in any desired position along their length. In the present invention I may make use of the component wind-shield parts and radial arms described in the aforesaid application but am here illustrating a different mode of the support for the said radial arms whereby the radial arms may be considerably shortened without interfering with the wind-shield being positioned in close proximity to the rear seat. This shortening of the radial arms with the resultant supporting of the wind-shield nearer to its main point of support is highly advantageous in lessening the strain on the parts due largely to the up and down movement of the vehicle in traveling on rough roads, crossing thank-ye-ma'ams, et cetera. Furthermore, the present invention enables in some cases the complete elimination of the radial arms and the direct support of the wind-shield in its desired position in respect to the rear seat of the vehicle.

In the drawings which form part of this application, I have illustrated my invention with the radial arms omitted and with the radial arms employed, but in so doing it is not to be understood that the invention is confined to the specific showing, as the drawings are merely for illustration so that the invention may be readily comprehended.

In these drawings—

Figure 1 is a plan of the wind-shield in operating position with the radial arms omitted;

Fig. 2 is a side elevation thereof in the position of Fig. 1;

Fig. 3 is a side elevation illustrating the said wind-shield folded up at the rear of the front seat of the vehicle;

Fig. 4 is a detailed view showing a portion of the construction of the said windshield supporting parts;

Fig. 5 is a plan of my invention with radial arms employed, the wind-shield being shown in one of its numerous operating positions; and Fig. 6 is a side elevation of the construction illustrated in Fig. 5.

Referring first to the form in which radial arms are not employed, the wind-shield comprises a main wind-shield section 5 and two auxiliary wind-shields 6 6 suitably pivoted one on each end of the main wind-shield. This joining of the wind-shield parts is preferably effected by means of hinges comprising the wings 7 7 and pins therefor 8 8 with means such as tubing 9 9 interposed between the auxiliary shields and the main shield for preventing the passage of air therebetween, all suitably proportioned and attached to constitute a joint, ornamental in appearance and firm in construction.

The pins 8 8 are rigidly mounted at their lower ends on shield supporting members here illustrated as blocks 10 10 and are threaded at their upper ends and supplied with frictional means such as thumb nuts 11 11 whereby the desired relation of the auxiliary shields with the main shield can be adjusted and maintained. The supporting blocks are pivotally mounted in pintles 12

12 and frictionally held therein by means of thumb nuts 13 13. This illustrated mounting provides for the erection of the shield in its desired upright position and its maintenance there as shown in Figs. 1 and 2 or the folding down of the shield and its maintenance in its downward position as indicated in Fig. 3.

The pintles 12 12 are supported on sleeves 15 15 which sleeves telescope on rods 16 16 and are frictionally held in the desired position thereon as by thumb nuts 17 17, the rods 16 16 being pivotally attached to the floor of the car 18 as by pivots 19 19 at the rear of the front seat 20 so as to have free movement in a vertical plane. The sleeves and rods constitute oblique braces. Braces 21 21 are pivotally connected in the upper part of the sleeves 15 15, and eyelets 22 22 are provided on the floor of the car for removable attachment therefor, the braces being bent at right angles for this purpose.

Suitable fastening means are provided for holding the wind-shield and its component parts against the back of the front seat when the wind-shield is folded down. Such means are here illustrated as comprising brackets 25 25 on which are pivotally connected hooks 26 26. The hooks are so shaped and mounted that when the wind-shield parts are folded back in position for fastening, they embrace the sleeves 15 15 and when it is desired to place the wind-shield in its operative position, they can be swung free therefrom.

In considering the use of the wind-shield of Figs. 1 to 4 inclusive, it may be assumed that the wind-shield is folded down at the rear of the front seat and that it is desired to raise it to operative position. The hooks 26 26 are disengaged from the sleeves 15 15 and with the wind-shield still folded down, the rods 16 16 are swung rearwardly and the braces 21 21 engaged in the eyelets 22 22. The sleeves 15 15 are then fastened in the desired position in respect to the rods 16 16; the thumb nuts 13 13 then loosened and the wind-shield erected in its desired position and the said thumb nuts then tightened to there maintain it. The auxiliary shields are then adjusted to the position desired and there maintained by the thumb nuts 11 11. When it is desired to fold the wind-shield down back of the front seat of course the reverse of this process would be employed.

The construction embodying radial arms illustrated in Figs. 5 and 6 is so nearly analogous to that in which the radial arms are not employed that no extensive description is given. Many of the parts are the same as is apparent from the similarity of reference numerals and the construction and operation of the radial arms themselves is fully set forth in the aforesaid application U. S. Reissue Letters Patent 14,872 of June 1, 1920. The supporting blocks 10 10 are replaced in the radial arm construction by sleeves 30 30 on which the wind-shield hinge pins 8 8 are firmly mounted. The sleeves are slidably mounted on radial arms 31 31 being held in the desired position thereon by thumb screws 32 32. The radial arms are curved inwardly and downwardly at their place of attachment, the downward portion being rotatably mounted in supports 33 33 which are frictionally held in the pintles 12 12 in the same manner as supporting blocks 10 10 in the construction of Figs. 1 to 4. The pintle mounting of the radial arms permits of their being adjusted horizontally of the car regardless of the angle which the rods 16 16 and sleeves 15 15 bear to the car floor. It is obvious that this angle may vary, depending upon the distance apart of the pivotal supports 19 19 and 22 22 and of the position of the sleeves 15 15 on the rods 16 16.

The operation of the wind-shield proper and the radial arms now under consideration is no different from that described in the aforesaid Letters Patent and should be readily understood therefrom. The operation of the other parts is the same as that already described in connection with Figs. 1, 2, 3 and 4.

The foregoing detailed description has been given for clearness of understanding and no undue limitation should be deduced therefrom but the appended claims should be construed as broadly as permissible in view of the prior art.

What I claim as new and desire to secure by Letters Patent is:

1. In a wind-shield for automobiles, the combination with supporting rods pivotally mounted to move in substantially vertical planes, sleeves telescoping on the rods and having means for maintaining them in adjusted position on said rods, braces pivotally connected with the sleeves and having detachable points of support in angular relation to the rods, hinge pins pivotally connected with the sleeves, means for maintaining the hinge pins in adjusted position relative to the sleeves, a main shield extending between the hinge pins and having ears through which the pins extend, auxiliary shields having ears over-lapping the ears on the main shield and through which the pins also extend, and means for retaining the auxiliary shields in adjusted position relatively to the main shield.

2. The combination with a tonneau wind-shield, of supporting arms pivotally mounted to move in substantially vertical planes and braces therefor, radial arms pivotally mounted upon the supporting arms, and sleeves with which the wind-shield is connected slidably mounted upon the radial arms.

3. The combination with a tonneau wind-shield, of supporting arms pivotally mounted to move in substantially vertical planes and braces therefor, radial arms, adjustable connections between the radial arms and the supporting arms whereby the radial arms may be maintained in the desired angular relation therewith, and sleeves with which the wind-shield is connected slidably mounted upon the radial arms.

Signed at New York, N. Y., this 18th day of April, 1917.

THEODORE B. NISBET.